United States Patent
Okuda et al.

(10) Patent No.: US 8,504,203 B2
(45) Date of Patent: Aug. 6, 2013

(54) MANIPULATOR AND METHOD OF CONTROLLING THE SAME

(75) Inventors: Akinobu Okuda, Osaka (JP); Soichiro Fujioka, Osaka (JP); Osamu Mizuno, Osaka (JP); Yoshihiko Matsukawa, Nara (JP); Tsuyoshi Tojo, Osaka (JP); Rie Takahashi, Osaka (JP); Tohru Nakamura, Osaka (JP)

(73) Assignee: Panasonic Corporation, Osaka (JP)

( * ) Notice: Subject to any disclaimer, the term of this patent is extended or adjusted under 35 U.S.C. 154(b) by 410 days.

(21) Appl. No.: 12/866,959

(22) PCT Filed: Mar. 5, 2009

(86) PCT No.: PCT/JP2009/001002
§ 371 (c)(1),
(2), (4) Date: Aug. 10, 2010

(87) PCT Pub. No.: WO2009/110242
PCT Pub. Date: Sep. 11, 2009

(65) Prior Publication Data
US 2010/0318224 A1    Dec. 16, 2010

(30) Foreign Application Priority Data
Mar. 6, 2008 (JP) .................. 2008-056102

(51) Int. Cl.
*G05B 19/04* (2006.01)

(52) U.S. Cl.
USPC ........................................... 700/255

(58) Field of Classification Search
USPC ................ 700/255; 901/14, 15, 49, 50
See application file for complete search history.

(56) References Cited

U.S. PATENT DOCUMENTS

| | | | |
|---|---|---|---|
| 6,429,139 B1 * | 8/2002 | Ryan et al. | 438/716 |
| 2004/0236469 A1 | 11/2004 | Moridaira et al. | |
| 2007/0234492 A1 * | 10/2007 | Svendsen et al. | 15/21.1 |

FOREIGN PATENT DOCUMENTS

| | | |
|---|---|---|
| JP | 9-207089 | 8/1997 |
| JP | 10-249777 | 9/1998 |
| JP | 2004-306247 | 11/2004 |
| JP | 2004-326437 | 11/2004 |
| JP | 2005-56066 | 3/2005 |
| JP | 2005056066 A * | 3/2005 |
| JP | 2005-100143 | 4/2005 |

OTHER PUBLICATIONS

International Search Report issued May 26, 2009 in International (PCT) Application No. PCT/JP2009/001002.

* cited by examiner

*Primary Examiner* — Khoi Tran
*Assistant Examiner* — Robert Nguyen
(74) *Attorney, Agent, or Firm* — Wenderoth, Lind & Ponack, L.L.P.

(57) ABSTRACT

A manipulator is provided with an arm, an arm, a holding section, a first joint section pivotally interconnecting the arm and the arm, a second joint section pivotally interconnecting the arm and the holding section, a first joint driving section capable of driving the first joint section, a second joint driving section capable of driving the second joint section, a member specifying section for specifying one of the arms which has a possibility of collision with an obstacle or which has collided with the obstacle, and a control device for controlling the first joint driving section and the second joint driving section to pivotally move the one of the arms specified by the member specifying section in a direction away from the obstacle, and pivotally move the other of the arms in a direction toward the obstacle.

13 Claims, 11 Drawing Sheets

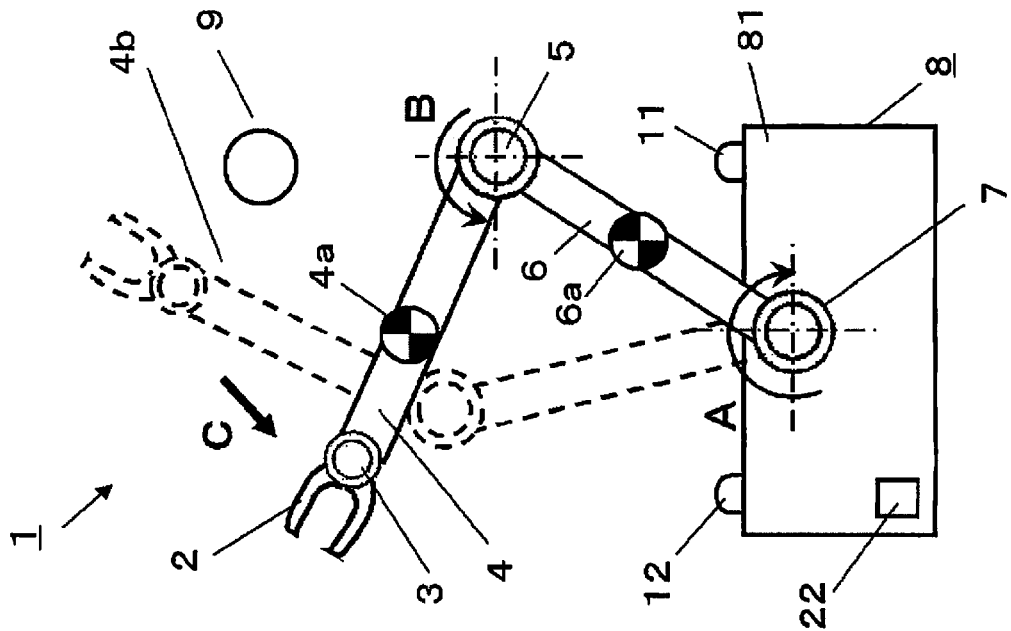
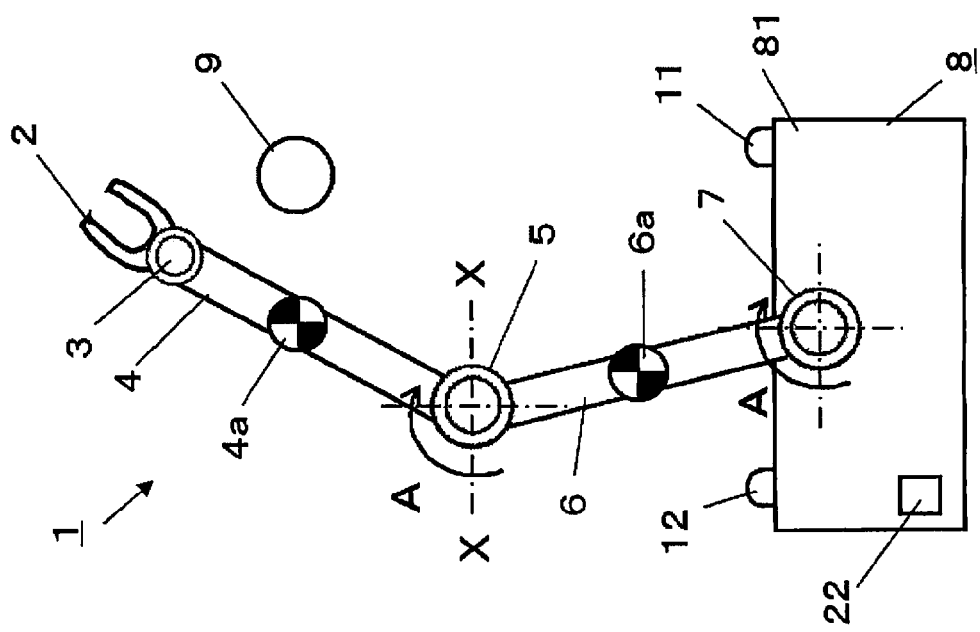

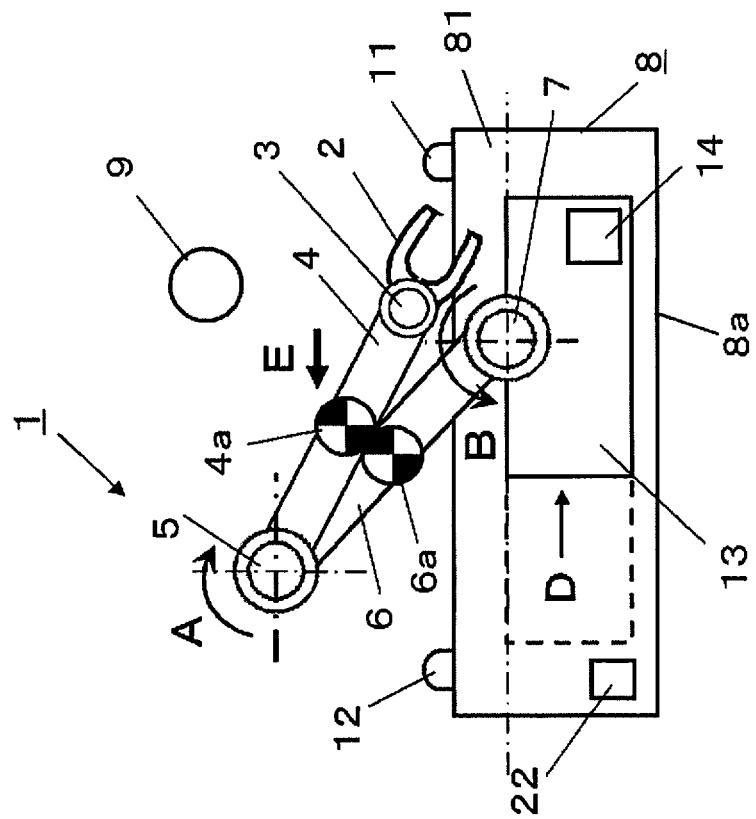

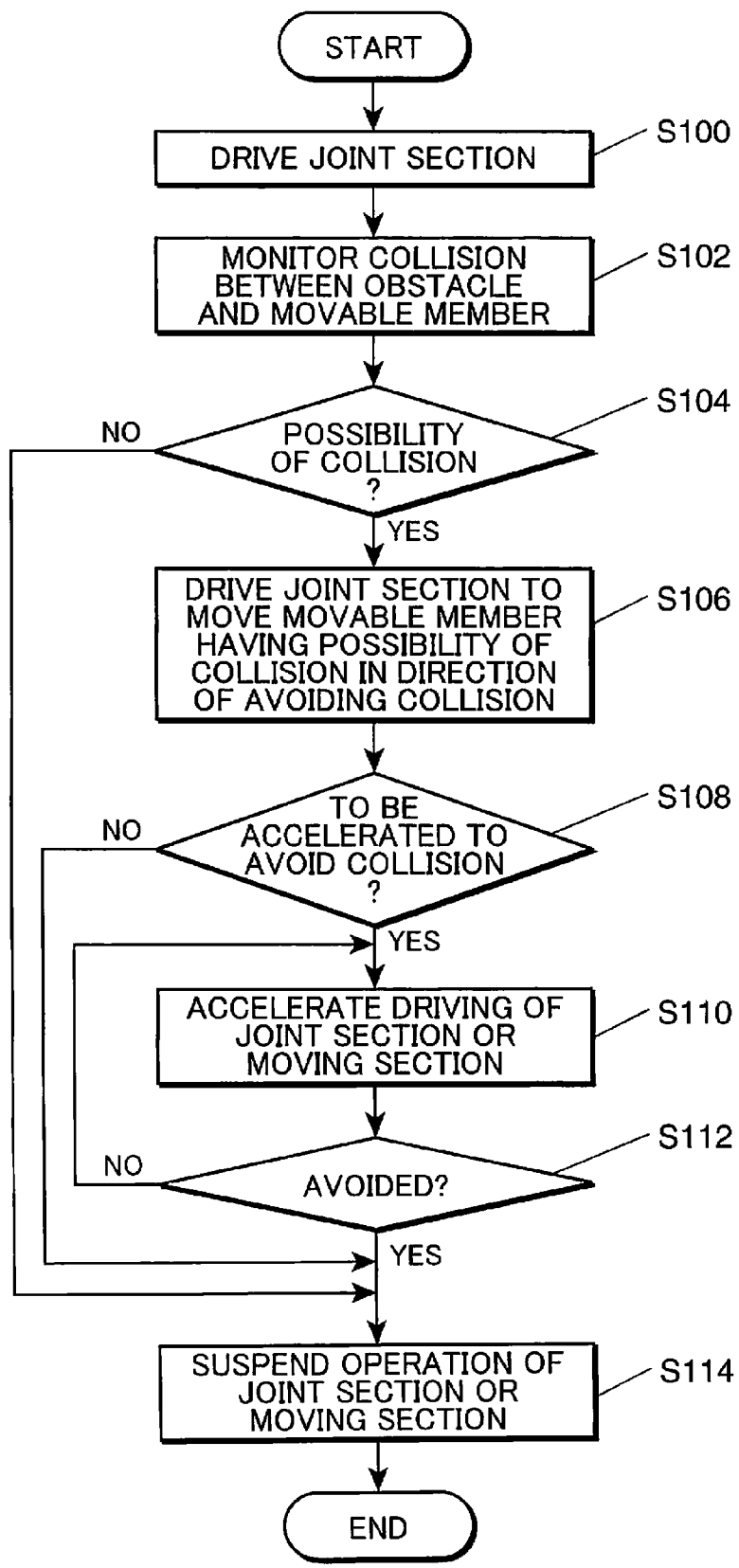

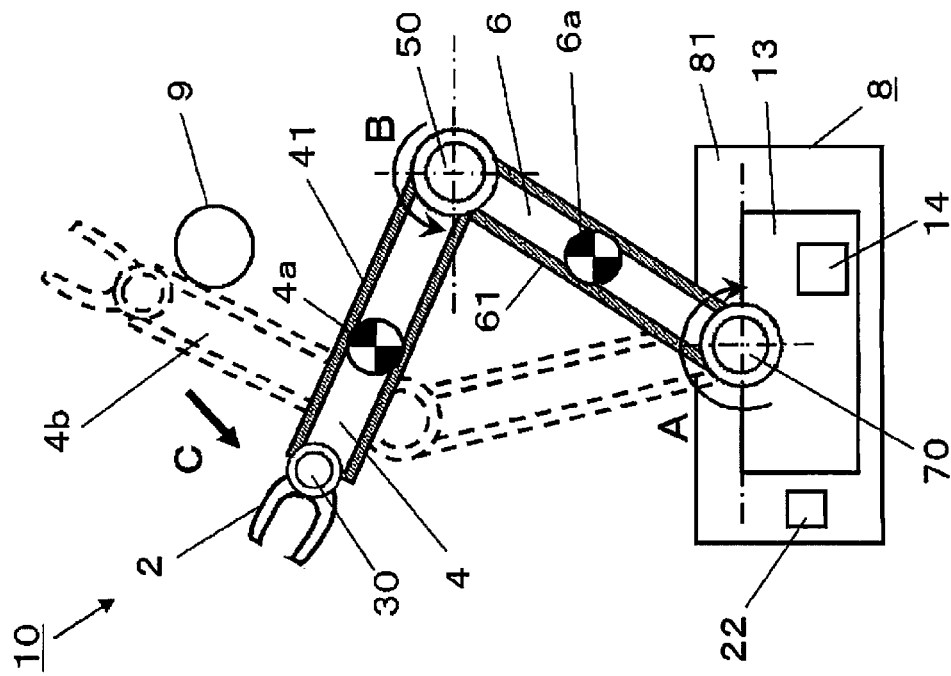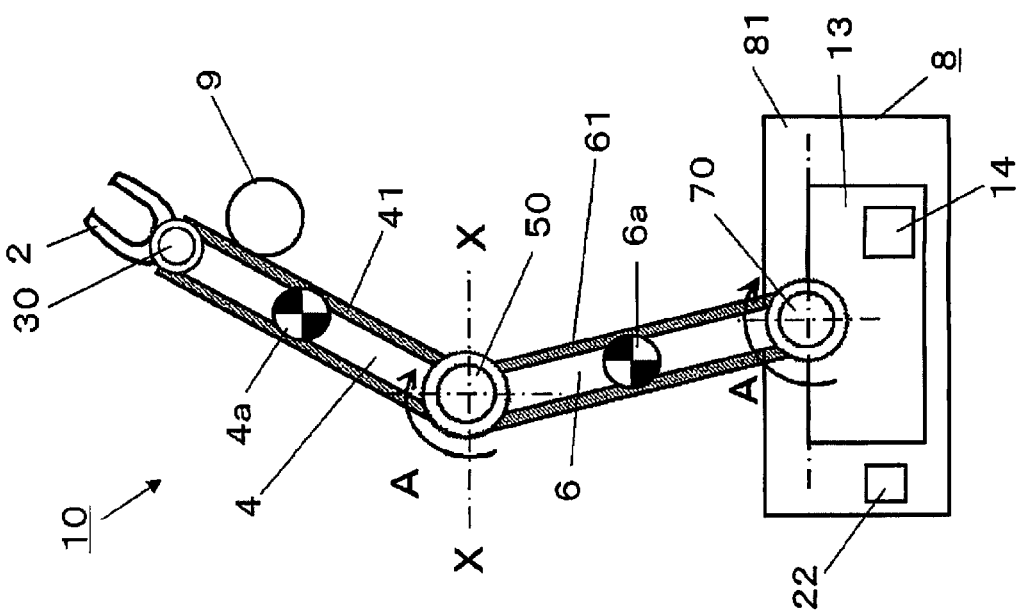

MANIPULATOR AND METHOD OF CONTROLLING THE SAME

TECHNICAL FIELD

The invention relates to a manipulator and a method of controlling the same.

RELATED ART

There has been made various proposals on the technology of avoiding collision with an obstacle.

For instance, in a conventional manipulator disclosed in patent literature 1, a camera is disposed at a distal end of a multi-articulate structural body to photograph an image near the distal end of the manipulator, and the posture of the manipulator is controlled in such a manner as to avoid collision with an obstacle, if the obstacle is detected.

In the conventional manipulator, in the case where an obstacle is detected in controlling the posture of the manipulator, the direction of a current flowing to a motor in a driving section for driving a movable member is inverted to apply a reverse torque to an aim. Collision with the obstacle is avoided by the reverse torque. Generally, in a manipulator, a speed reducing mechanism is provided in an output section of a motor to apply a driving torque, and the rotation number of the motor is set to a relatively large value while the motor is driven. As a result, a time required from a point of time when the motor starts decelerating to a point of time when a reverse torque is applied tends to increase. Specifically, there is a problem in the conventional manipulator that responsiveness in avoiding collision or applying a reverse torque to avoid collision may be insufficient, because a time required until a movable member starts moving in a reverse direction is relatively long.

Patent Literature 1: JP Hei 9-207089A

SUMMARY OF THE INVENTION

In view of the above, an object of the invention is to provide a manipulator that enables to promptly drive a movable member in a reverse direction, and a method of controlling the manipulator.

A manipulator according to an aspect of the invention includes a first movable member; a second movable member; a holding section; a first joint section pivotally interconnecting the first movable member and the second movable member; a second joint section pivotally interconnecting the second movable member and the holding section; a first joint driving section capable of driving the first joint section; a second joint driving section capable of driving the second joint section; a member specifying section for specifying one of the first movable member and the second movable member which has a possibility of collision with an obstacle, or which has collided with the obstacle; and a control device for controlling the first joint driving section and the second joint driving section in such a manner as to pivotally move the one movable member specified by the member specifying section in a direction away from the obstacle, and pivotally move the other movable member in a direction toward the obstacle.

A manipulator according to another aspect of the invention includes a first movable member; a second movable member; a first joint section pivotally interconnecting the first movable member and the second movable member; a moving section including a moving/driving section; a third joint section pivotally interconnecting the second movable member and the moving section; a first joint driving section capable of driving the first joint section; a third joint driving section capable of driving the third joint section; a member specifying section for specifying one of the first movable member and the second movable member which has a possibility of collision with an obstacle, or which has collided with the obstacle; and a control device for controlling the first joint driving section, the third joint driving section, and the moving/driving section in such a manner as to pivotally move the one movable member specified by the member specifying section in a direction away from the obstacle, move the moving section in the direction away from the obstacle, in the case where the one movable member is the first movable member, and move the moving section in a direction toward the obstacle, in the case where the one movable member is the second movable member.

A method of controlling a manipulator according to yet another aspect of the invention is a method of controlling a manipulator provided with a first movable member, a second movable member, a holding section, a first joint section pivotally interconnecting the first movable member and the second movable member, a second joint section pivotally interconnecting the second movable member and the holding section, a first joint driving section capable of driving the first joint section, and a second joint driving section capable of driving the second joint section. The method includes a member specifying step of specifying one of the first movable member and the second movable member which has a possibility of collision with an obstacle, or which has collided with the obstacle; and a controlling step of controlling the first joint driving section and the second joint driving section in such a manner as to pivotally move the one movable member specified in the member specifying step in a direction away from the obstacle, and pivotally move the other movable member in a direction toward the obstacle.

A method of controlling a manipulator according to still another aspect of the invention is a method of controlling a manipulator provided with a first movable member, a second movable member, a moving section including a moving/driving section, a first joint section pivotally interconnecting the first movable member and the second movable member, a third joint section pivotally interconnecting the second movable member and the moving section, a first joint driving section capable of driving the first joint section, and a third joint driving section capable of driving the third joint section. The method includes a member specifying step of specifying one of the first movable member and the second movable member which has a possibility of collision with an obstacle, or which has collided with the obstacle; and a controlling step of controlling the first joint driving section, the third joint driving section, and the moving/driving section in such a manner as to pivotally move the one movable member specified in the member specifying step in a direction away from the obstacle, move the moving section in the direction away from the obstacle, in the case where the one movable member is the first movable member, and move the moving section in a direction toward the obstacle, in the case where the one movable member is the second movable member.

BRIEF DESCRIPTION OF THE DRAWINGS

FIGS. 3A and 3B are schematic front views showing a first example of a collision avoiding operation to be performed by the manipulator.

FIGS. 4A and 4B are schematic front views showing a second example of a collision avoiding operation to be performed by the manipulator.

FIG. 7 is a flowchart for describing an obstacle avoiding operation to be performed by the manipulator.

FIGS. 10A and 10B are schematic front views showing a first example of a retracting operation to be performed by the manipulator in the second embodiment.

DETAILED DESCRIPTION OF THE PREFERRED EMBODIMENTS OF THE INVENTION

Figure 1:
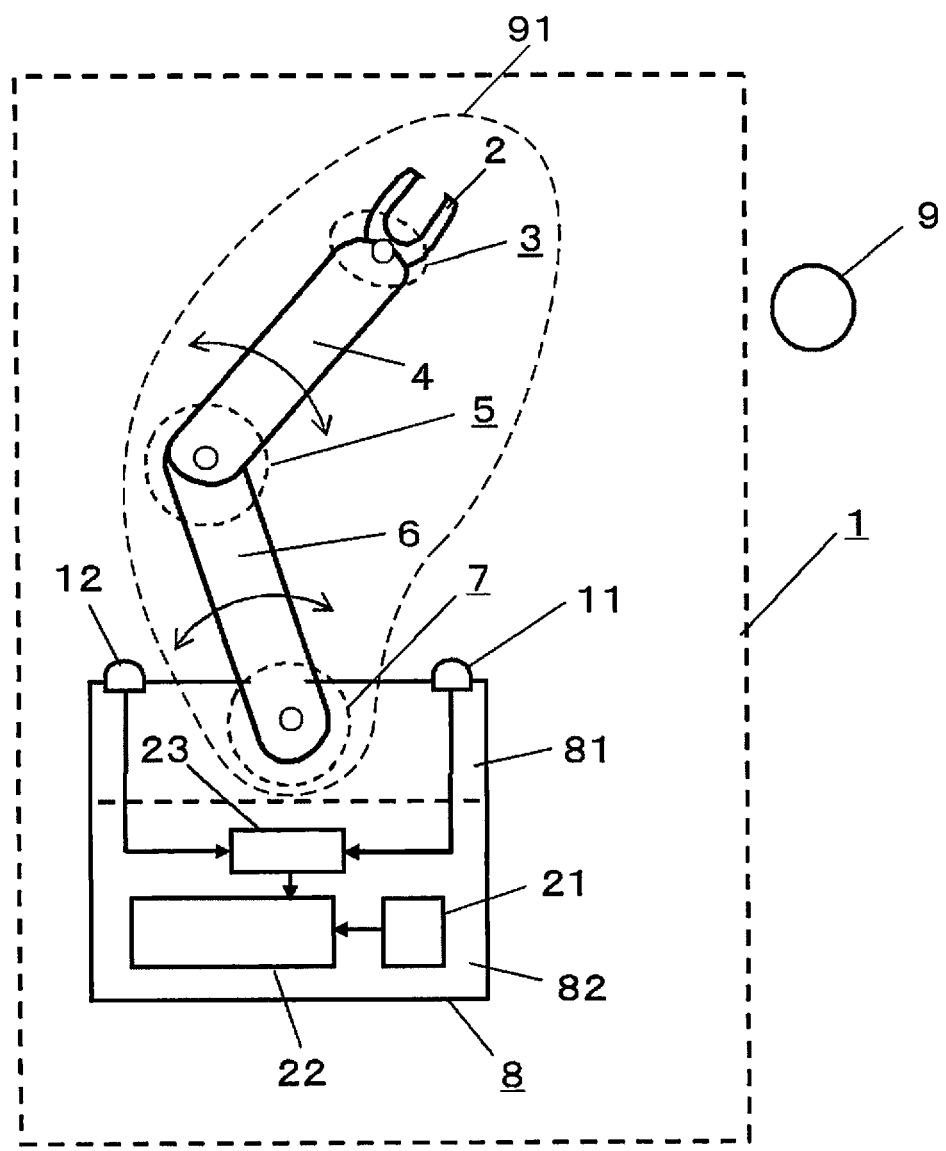
FIG. 1 is a schematic construction diagram of a manipulator in accordance with a first embodiment of the invention.

In the following, embodiments of the invention will be described in detail referring to the drawings.

First Embodiment

Firstly, an arrangement of a manipulator in accordance with the first embodiment of the invention is described referring to FIG. 1. FIG. 1 is a schematic construction diagram of the manipulator 1 in accordance with the first embodiment of the invention.

The manipulator 1 includes a movable section 91, and a holding section 8 for holding the movable section 91. The movable section 91 has a hand 2 as a movable member, an arm 4 as a movable member, and an arm 6 as a movable member. Alternatively, the movable section 91 may have at least two movable members (a first movable member and a second movable member). For instance, the movable section 91 may have only of the hand 2 and the arm 4, or only of the arm 4 and the arm 6, or may be interconnected to another movable member.

The hand 2 has a function of gripping an object, and is interconnected to a distal end of the arm 4 through a joint section 3. A base end of the arm 4 is interconnected to a distal end of the arm 6 through a joint section 5. A base end of the arm 6 is interconnected to the holding section 8 through a joint section 7. The hand 2, the arm 4, and the arm 6 are pivotally interconnected to each other. A pivot shaft of the joint section 5, and a pivot shaft of the joint section 7 are aligned in parallel to each other in a direction perpendicular to the plane of FIG. 1.

The holding section 8 includes a mechanism section 81 and a driving section 82. The mechanism section 81 has photographing sections 11 and 12 operable to photograph an image of the movable section 91. The photographing sections 11 and 12 are also operable to photograph an image of an obstacle 9 which may collide the movable section 91. The driving section 82 has an input section 21 for allowing a user to input an operation command, a collision monitoring section 23 for monitoring collision with the obstacle 9, and a control device 22 for controlling joint driving sections (actuators 31, 51, and 71 to be described later) to drive the hand 2, the arm 4, and the arm 6. The photographing sections 11 and 12 output photographed images to the collision monitoring section 23. The control device 22 controls the joint driving sections, based on operation command information acquired from the input section 21, and monitor information acquired from the collision monitoring section 23.

In this example, the photographing sections 11 and 12 are provided in the mechanism section 81. Alternatively, the photographing sections 11 and 12 may be provided independently of the mechanism section 81 (for instance, the photographing sections 11 and 12 may be disposed in the peripheral environment where the entirety of the manipulator 1 is viewable).

Figure 2:
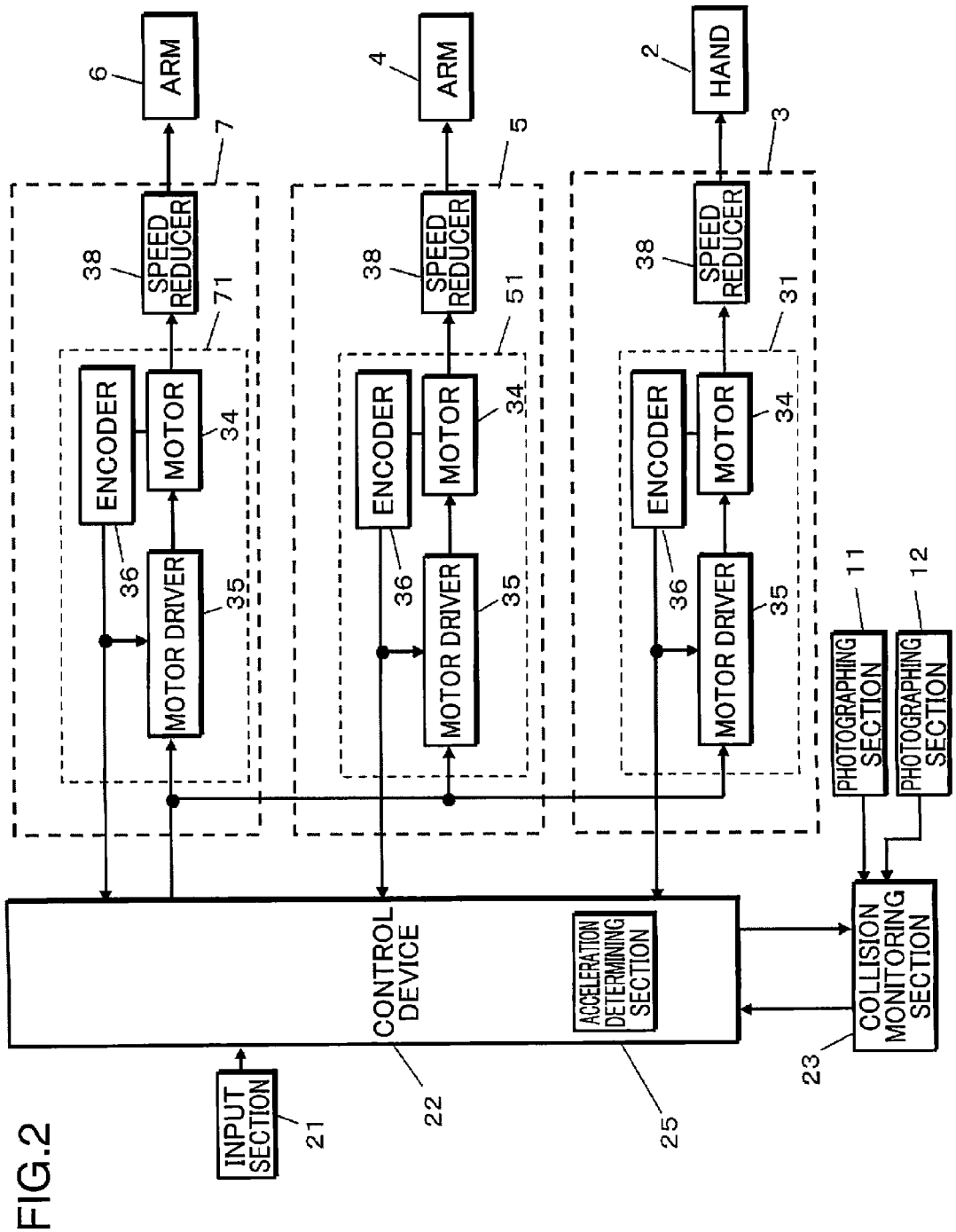
FIG. 2 is a block diagram showing an arrangement of the manipulator.

Next, a construction and an operation of the manipulator 1 are described referring to FIG. 2. FIG. 2 is a block diagram showing a construction of the manipulator 1 in accordance with the first embodiment of the invention.

The joint sections 3, 5, and 7 respectively have the actuators 31, 51, and 71 as the joint driving sections. The actuator 31 drives the hand 2 to rotate the hand 2 with respect to the arm 4 through a speed reducer 38. Similarly, the actuator 51 drives the arm 4 to rotate the arm 4 with respect to the arm 6 through a speed reducer 38. The actuator 71 drives the arm 6 to rotate the arm 6 with respect to the holding section 8 through a speed reducer 38. Each of the speed reducers 38 reduces the rotation of a corresponding motor 34 to be described later by a gear or a like member, and increases a driving torque of the actuator 31, 51, 71. The speed reducers 38 further have a function as a power transmission mechanism for transmitting driving forces of the actuators 31, 51, and 71 to the hand 2, the arm 4, and the arm 6, respectively. Examples of the speed reducer 38 are a planetary gear speed reducer, a spur gear speed reducer, and a belt-driven speed reducing mechanism.

Each of the actuators 31, 51, and 71 includes a driving motor 34, a motor driver 35 for driving the motor 34, and an encoder 36.

The motor driver 35 has a drive circuit such as an H-bridge drive circuit, and supplies an electric power to the motor 34 by the drive circuit to rotate the motor 34 in forward and backward directions.

The encoder 36 is configured to be coupled to a shaft (not shown) of the motor 34 to detect rotation information of the motor 34. Examples of the encoder 36 are an optical encoder comprising of a coding plate and a photodetector; and a magnetic encoder comprising of a hall element or a magnetic resistor element, and a rotary magnet having a north pole and a south pole.

The input section 21 has an unillustrated input device. The input section 21 outputs, to the control device 22, an operation command inputted through the input device. Examples of the input device are a key input device, a joystick, and a touch panel. In the example shown in FIG. 1, the input section 21 is housed in the holding section 8. Alternatively, the input section 21 may be configured to be detachably attached to the holding section 8, or may be configured to be an independent unit. Further alternatively, in the case where the manipulator 1 is configured to be movable by itself, the input section 21 may be configured to receive an operation command inputted from an external device such as a high-order control device (not shown).

The collision monitoring section 23 analyzes two images photographed by the photographing sections 11 and 12, and monitors e.g. movement information of the obstacle 9 including distance/direction information detected through stereoscopic viewing, and positional relation information representing e.g. a positional relation between the obstacle 9 and the movable section 91. The collision monitoring section 23 determines whether or not there is a possibility of collision between the obstacle 9 and the movable section 91. In the case where the collision monitoring section 23 has determined that there is a possibility of collision between the obstacle 9 and the movable section 91, a movable member (e.g. the arm 4) of the movable section 91 having a possibility of collision is specified; and information (movement information and position information) of the obstacle 9, and position information of the movable member having a possibility of collision are outputted to the control device 22, as monitor information. Alternatively, the function of the collision monitoring section 23 may be provided as a function of the control device 22. In this example, a stereo camera method utilizing a parallax between the photographing sections 11 and 12 is used as means for monitoring e.g. a movement of the obstacle 9 including distance/direction information, and a positional relation between the obstacle 9 and the movable section 91. The embodiment is not limited to the above. For instance, there may be used a distance image sensor constructed in such a manner that a time of flight required for light emitted from a light emitting diode to return to a CCD (Charge Coupled Device) by reflection on a target measurement object is measured, and a distance from an image of the target measurement object to the target measurement object is outputted pixel by pixel by superimposing image information.

The control device 22 includes a central processing unit (CPU) for executing various functions based on a program, a read only memory (ROM) storing various programs and the like, a random access memory (RAM) for temporarily storing data, and an input/output section for allowing input/output of data with respect to an external device. The control device 22 having the above configuration executes various programs based on an operation command acquired from the input section 21 and monitor information acquired from the collision monitoring section 23 to thereby control and drive the actuator 31, 51, 71 to perform a collision avoiding operation, in the case where there is a possibility of collision between the movable section 91 and the obstacle 9. Further, the control device 22 is operable to detect positions and postures of the hand 2, the arm 4, and the arm 6, and respective angles between the movable members, based on rotation information of the motors 34 acquired from the encoders 36. Furthermore, the control device 22 is operable to acquire information (pivotal direction information) relating to a pivotal direction of a movable member (e.g. the arm 6) different from the movable member (e.g. the arm 4) specified by the collision monitoring section 23, based on rotation direction information of the motors 34 acquired from the encoders 36.

The control device 22 is further provided with an acceleration determining section 25. The acceleration determining section 25 determines whether or not the manipulator 1 is to be accelerated in performing a collision avoiding operation between the obstacle 9 and the movable section 91. The acceleration determining section 25 will be described later.

Next, a collision avoiding operation to be performed by the manipulator 1 with respect to the obstacle 9 is described referring to FIG. 2, and FIGS. 3A through 4B. FIGS. 3A and 3B are schematic front views showing a first example of a collision avoiding operation to be performed by the manipulator 1 in accordance with the first embodiment. FIGS. 4A and 4B are schematic front views showing a second example of a collision avoiding operation to be performed by the manipulator 1 in accordance with the first embodiment.

Firstly, the first example of a collision avoiding operation to be performed by the manipulator 1 is described referring to FIGS. 2 through 3B.

The control device 22 drives the actuator 31, 51, 71 in accordance with an operation command from the input section 21, and acquires monitor information from the collision monitoring section 23. The control device 22 starts an operation of moving a movable member in such a direction as to avoid collision with the obstacle 9, based on e.g. information relating to the position/posture of a movable member (the hand 2, or the arm 4, or the arm 6) of the movable section 91 having a possibility of collision, information relating to the position/posture of the other movable member(s), and driving information (including pivotal direction information) of the joint section 3, 5, 7, in the case where a possibility of collision between the obstacle 9 and the movable section 91 is detected based on the monitor information. Specifically, the control device 22 generates control information for moving a movable member in such a direction as to avoid collision with the obstacle 9, drives the actuator 31, 51, 71 based on the control information, and controls the joint section 3, 5, 7 to pivotally move the joint section 3, 5, 7.

For instance, the manipulator 1 drives the actuator 31, 51, 71 in accordance with an operation command from the input section 21. For instance, the manipulator 1 suspends an operation of the actuator 31, and drives the actuators 51 and 71 in accordance with an operation command.

As a result of the above operation, for instance, as shown in FIG. 3A, the manipulator 1 pivotally moves the arm 4 in the direction of arrow A about an axis of rotation of the joint section 5, and pivotally moves the arm 6 in the direction of arrow A about an axis of rotation of the joint section 7. In other words, the direction of pivotally moving the arm 6, and the direction of pivotally moving the arm 4 are identical to each other with respect to the joint section 7.

In response to the pivotal movement, for instance, in the case where there is a possibility of collision between the obstacle 9 and the arm 4, the collision monitoring section 23 is activated, and outputs monitor information. The monitor information is inputted to the control device 22.

The control device 22 controls the actuators 51 and 71 to drive the actuators 51 and 71 based on the monitor information, after having detected a possibility of collision between the arm 4 and the obstacle 9. Specifically, the actuator 51 drives the arm 4 with a rotation torque in a direction opposite to the direction of arrow A, and the actuator 71 accelerates the pivotal movement of the arm 6 by increasing a rotation torque, without changing the pivotal direction of the arm 6. In other words, the manipulator 1 accelerates and pivotally moves the arm 6 in a collision direction with respect to the obstacle 9, while pivotally moving the arm 4 with respect to the arm 6 in a collision avoiding direction (the direction of arrow B in FIG. 3B) with respect to the obstacle 9.

As shown in FIG. 3B, in response to acceleration of the pivotal movement of the arm 6 in the direction of arrow A about an axis of rotation of the joint section 7, the base end of the arm 4 is accelerated in the direction of arrow A. As a result of the above operation, a reaction force (a rotary moment) by an inertia force is acted on a centroid position 4$a$ of the arm 4. The reaction force is acted in such a way as to pivotally move the arm 4 in the direction of arrow B about the axis of rotation of the joint section 5. Specifically, accelerating the pivotal movement of the arm 6 by the reaction force enables to assist an operation of reversing the pivotal movement of the arm 4. In the above arrangement, since a rotary moment in a direction opposite to the collision direction is acted on the arm 4, despite that the pivotal movement of the arm 6 is accelerated in the collision direction with respect to the obstacle 9, the posture of the arm 4 is promptly shifted in the direction of arrow B. In other words, the arm 4 is moved in a direction away from the obstacle 9.

As a result of the above operation, the manipulator 1 is operable to drive the arm 4 to pivotally move the arm 4 in the direction of arrow B, with a reaction force by an inertia force being acted, in addition to a rotation torque of the actuator 51. Accordingly, it is possible to promptly move the arm 4 in such a direction to avoid collision with the obstacle 9.

Further, the movable section 91 is driven to be bent toward the holding section 8 depending on a posture of the arm 6. This enables to more securely avoid collision of the arm 4 with the obstacle 9.

As described above, the manipulator 1 is operable to drive the arm 4 to pivotally move the arm 4 in the collision avoiding direction by utilizing a reaction force in addition to a rotation torque of the actuator 51, by accelerating the pivotal movement of the arm 6 without changing the pivotal direction of the arm 6. This enables to promptly avoid collision of the arm 4 with the obstacle 9.

As described above, it is possible to promptly avoid collision of the arm 4 with the obstacle 9, since a reaction force is utilized in this embodiment, even if a mechanical/electrical time constant of the actuator 51 is large, or even if a driving force of the actuator 51 is small.

Next, a second example of a collision avoiding operation is described referring to FIGS. 4A and 4B.

In the first example, a reaction force is generated in a direction (the direction of arrow B in FIG. 3B) of reversing the pivotal movement of the arm 4 by accelerating the pivotal movement of the arm 6 in the direction of arrow A in FIGS. 3A and 3B. In the second example, a reaction force is generated by moving the joint section 7 serving as a center of pivotal movement of the arm 6.

The holding section 8 of the manipulator 1 includes a holding section main body 8a, and a moving section 13 for moving the movable section in parallel to the holding section main body 8a. Collision is avoided by using the moving section 13.

The moving section 13 is a member designed to be slidably movable in a predetermined direction relative to the holding section main body 8a of the holding section 8. An example of the moving section 13 is a rectilinear slider. Since the joint section 7 is supported on the moving section 13, the moving section 13 is operable to move the movable section 91 in parallel to the direction of arrow D in FIG. 4B. The moving section 13 includes a moving/driving section 14. The moving/driving section 14 has a motor (not shown), a speed reducer (not shown), a driver (not shown) for driving the motor, and is controlled by the control device 22. The arm 6 is pivotally interconnected to the moving section 13 through the joint section 7. It is desirable to align the moving direction of the moving section 13 with a direction perpendicular to the pivot shaft of the joint section 7 in order to securely generate a reaction force by moving the moving section 13. Alternatively, in the case where a moving range of the moving section 13 is restricted depending on e.g. the construction of the holding section 8, the moving direction of the moving section 13 may be aligned with a direction other than the above.

In this example, for instance, as shown in FIG. 4A, a collision avoiding operation with respect to the obstacle 9 is described by taking an example, wherein the centroid position 4a of the arm 4 is located, at a base end (on the side of the mechanism section 81 with respect to X-X axis) with respect to the joint section 5. In this case, the manipulator 1 performs a collision avoiding operation, based on the positional relation between the obstacle 9 and the arm 4, and the operation status of the arm 4, 6 in the second example.

The manipulator 1 drives the actuator 31, 51, 71 in accordance with an operation command from the input section 21. For instance, the manipulator 1 suspends an operation of the actuator 31, and drives the actuators 51 and 71. Specifically, the manipulator 1 pivotally moves the arm 4 in the direction of arrow B around the joint section 5, and pivotally moves the arm 6 in the direction of the arrow A around the joint section 7.

In performing the above operation, in the case where there is a possibility of collision between the obstacle 9 and the arm 4, the collision monitoring section 23 is activated to output monitor information to the control device 22. The control device 22 controls the actuators 51 and 71, and the moving/driving section 14 in such a manner as to move the arm 4 in a direction of avoiding collision with the obstacle 9, based on the monitor information.

Specifically, after having detected a possibility of collision between the arm 4 and the obstacle 9, the control device 22 controls the actuator 51 to drive the arm 4 with a rotation torque in a direction (the direction of arrow A) opposite to the direction of arrow B, and controls the actuator 71 to drive the arm 6 with a rotation torque in a direction (the direction of arrow B) opposite to the direction of arrow A. As a result of the above operation, the pivotal direction of the arm 4 around the joint section 5 is reversed, and the pivotal direction of the arm 6 around the joint section 7 is also reversed. The control device 22 further drives the moving/driving section 14 in such a manner as to accelerate the movement of the moving section 13 in the direction of arrow D from an operation-suspended state. Specifically, the manipulator 1 accelerates the movement of the moving section 13 in the collision direction with respect to the obstacle 9, while pivotally moving the arm 4 and the arm 6 in reverse directions, respectively.

As shown in FIG. 4B, in response to acceleration of the movement of the moving section 13 in the direction of arrow D, the base end of the arm 6 is accelerated in the direction of arrow D. As a result of the above operation, a reaction force (a rotary moment) by an inertia force is acted on the centroid position 4a of the arm 4 in the direction of arrow E. The reaction force is acted on the arm 4 to pivotally move the arm 4 in the direction of arrow A about the axis of rotation of the joint section 5. Similarly, a reaction force by an inertia force is acted on a centroid position 6a of the arm 6 in the direction of arrow E. As a result of the above operation, a force for pivotally moving the arm 6 about the axis of rotation of the joint section 7 in the direction of arrow B is acted on the arm 6. Accordingly, a reaction force by an inertia force is acted on the centroid position 4a of the arm 4 and the centroid position 6a of the arm 6 in the direction of arrow E, as an assisting force for reversing the pivotal movements of the arms 4 and 6, despite acceleration of the moving section 13 in the collision direction (the direction of arrow D) with respect to the obstacle 9. This enables to promptly move the arm 4, which has been specified to have a possibility of collision with the obstacle 9, in a direction away from the obstacle 9.

As described above, the manipulator 1 applies, to the arm 4, a rotation torque in the reverse direction (collision avoiding direction), and avoids collision of the arm 4 with the obstacle 9 by utilizing a reaction force in addition to the rotation torque. This enables to promptly avoid collision.

In performing a collision avoiding operation of the arm 4, for instance, an accelerating operation of the arm 6 and an accelerating operation of the moving section 13 may be combined, or either one of the accelerating operations may be performed.

Figure 5:
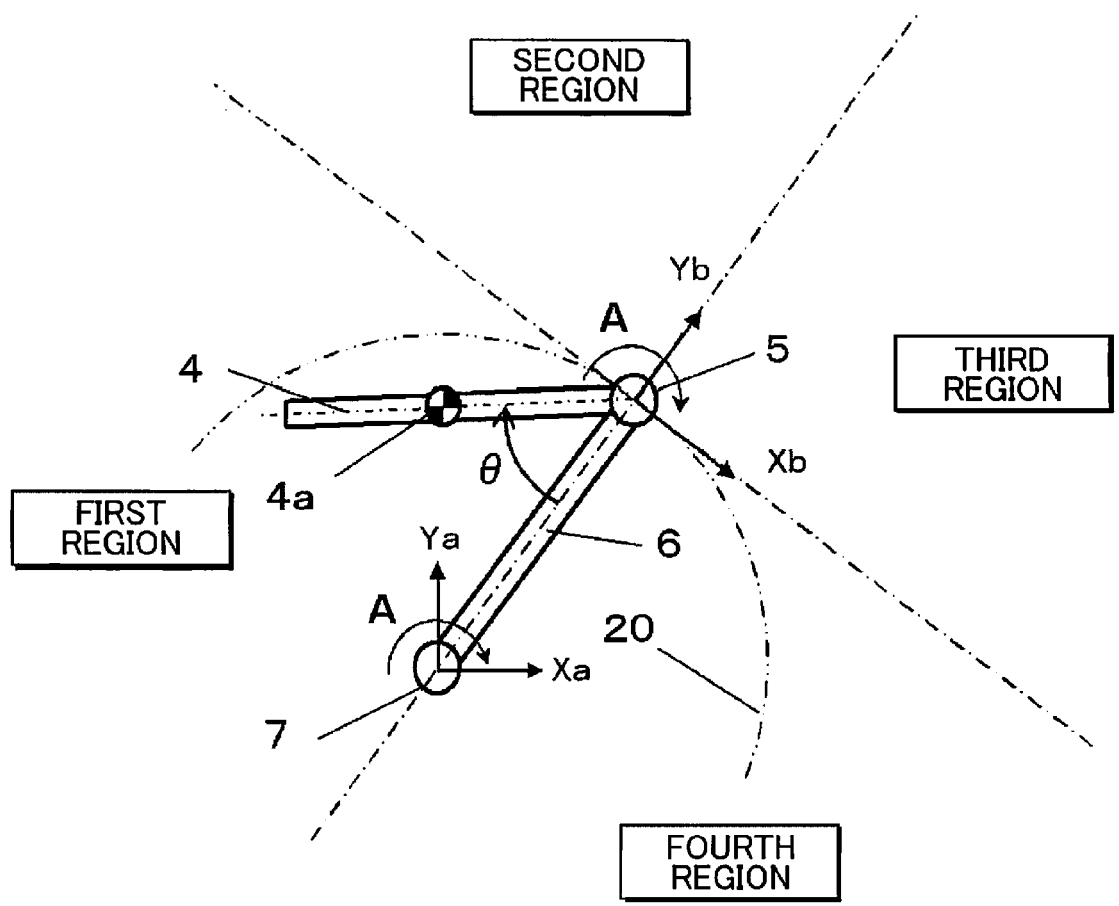
FIG. 5 is a diagram for describing an acceleration determining condition by an acceleration determining section of the manipulator.

Next, the acceleration determining section 25 in the control device 22 is described referring to FIG. 5, and FIGS. 6A through 6D. FIG. 5 is a diagram for describing an acceleration determining condition by the acceleration determining section 25 in the manipulator 1 in accordance with the first embodiment of the invention. FIGS. 6A through 6D are diagrams for describing a direction of a reaction force component (hereinafter, simply called as a reaction force) which contributes to pivotal movement of the movable member 2, 4, 6 of the manipulator 1.

As shown in FIG. 5, the acceleration determining section 25 determines whether or not the manipulator 1 is to be accelerated by an acceleration determining condition, which is determined based on an angle θ between the arm 6 and the arm 4, a positional relation between the arm 4 and the obstacle 9, and a pivotal direction of the arm 6. Then, if it is determined that the direction of the reaction force acting on the centroid position 4a of the arm 4 contributes to a collision avoiding operation, the acceleration determining section 25 outputs a determination result "ACCELERATE AND PIVOTALLY MOVE". If it is determined that the direction of the reaction force acting on the centroid position 4a does not contribute to a collision avoiding operation, the acceleration determining section 25 outputs a determination result "DO NOT ACCELERATE AND PIVOTALLY MOVE".

In the following, determination as to whether the manipulator 1 is to be accelerated is concretely described. As shown in FIG. 5, an operation example is described, wherein the arm 6 is pivotally moved clockwise (in the direction of arrow A) with respect to the original point of absolute coordinate axes Xa and Ya orthogonal to each other, and the arm 4 is pivotally moved clockwise (in the direction of the arrow A) with respect to the original point of relative coordinate axes Xb and Yb orthogonal to each other. As shown in FIG. 5, the original point of the absolute coordinate axes Xa and Ya is set at the center of rotation of the joint section 7, and the original point of the relative coordinate axes Xb and Yb is set at the center of rotation of the joint section 5. The relative coordinate axis Xb is set in a direction orthogonal to the longitudinal direction of the arm 6, and the relative coordinate axis Yb is set in the longitudinal direction of the arm 6.

In this example, the original point of the relative coordinate axes Xb and Yb travels on a circumference 20 of a circle having a radius corresponding to a distance between the original point of the relative coordinate axes Xb and Yb, and the original point of the absolute coordinate axes Xa and Ya, with the original point of the absolute coordinate axes Xa and Ya serving as a center.

The acceleration determining section 25 determines a direction of a reaction force acting on the centroid position 4a of the arm 4, based on the position of the arm 4 in a coordinate system defined by the relative coordinate axes Xb and Yb; and determines whether the manipulator 1 is to be accelerated based on the direction of the reaction force, and a positional relation between the arm 4 and the obstacle 9. Specifically, the acceleration determining section 25 determines a direction of a reaction force, in the case where the centroid position of the arm 4 is in a first region (Xb<0, Yb<0), a second region (Xb<0, Yb>0), a third region (Xb>0, Yb>0), and a fourth region (Xb>0, Yb<0) in the coordinate system defined by the relative coordinate axes Xb and Yb. Then, the acceleration determining section 25 determines whether the manipulator 1 is to be accelerated, based on the direction of the reaction force, and a positional relation between the arm 4 and the obstacle 9. In FIG. 5, the angle θ defined by the arm 6 and the arm 4 is equal to an angle defined by the arm 4 and the arm 6 in the pivotal direction of the arm 4 as a positive direction with respect to the centerline of the arm 6 in agreement with a line segment connecting the centers of pivotal movements of the joint section 5 and the joint section 7. In other words, the angle at which the arm 4 is overlapped with the arm 6 is set to zero, and the angle, by which the arm 4 is pivotally moved clockwise in FIG. 5 from the above angular position, is set to θ.

Next, a direction of a reaction force acting on the centroid of the arm 4 in each of the first through the fourth regions is described referring to FIGS. 6A through 6D.

Figure 6A:
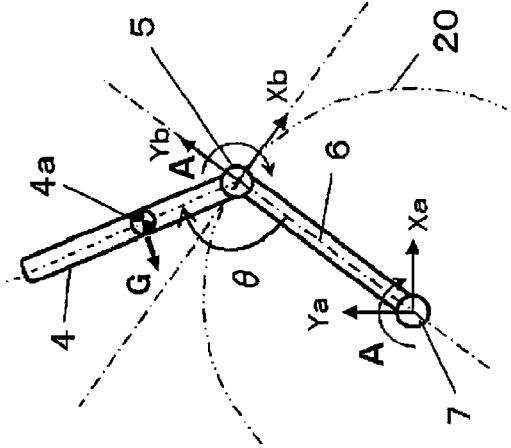
FIGS. 6A through 6D are diagrams for describing a direction of a reaction force component which contributes to rotation of a movable member of the manipulator.

FIG. 6A shows an example, wherein the centroid position 4a of the arm 4 is in the first region. Describing the first region in terms of the angle θ, the first region is a region where 0°<θ<90°. In this case, a reaction force exerted on the centroid position 4a of the arm 4 by accelerating the arm 6 is acted in the direction of arrow F. Specifically, a reaction force is acted in the same direction as the direction of shifting the centroid position 4a by pivotal movement of the arm 4 in the direction of arrow A. Accordingly, the acceleration determining section 25 determines "ACCELERATE AND PIVOTALLY MOVE", in the case where the obstacle 9 is on a side (i.e. in a direction of decreasing the angle θ) opposite to the direction of accelerating the pivotal movement of the arm 4 by the reaction force. This is because the direction of the reaction force acting on the arm 4 by accelerating the arm 6 is aligned with the collision avoiding direction. On the other hand, in the case where the obstacle 9 is in a direction (i.e. in a direction of increasing the angle θ) of pivotally moving the arm 4 by the reaction force, the acceleration determining section 25 determines "DO NOT ACCELERATE AND PIVOTALLY MOVE". This is because, in this case, the reaction force is acted in the collision direction.

Figure 6B:
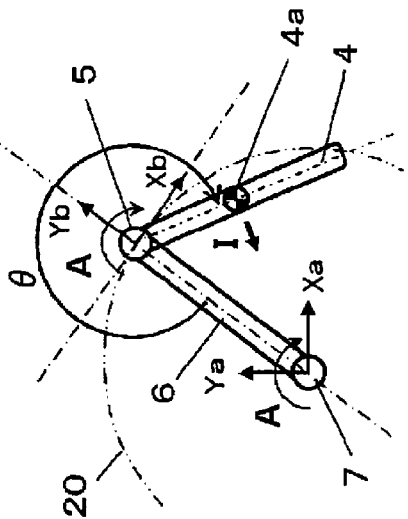

FIG. 6B shows an example, wherein the centroid position 4a of the arm 4 is in the second region. Describing the second region in terms of the angle θ, the second region is a region where 90°<θ<180°. In this case, a reaction force exerted on the centroid position 4a of the arm 4 by accelerating the arm 6 is acted in the direction of arrow G. Specifically, a reaction force is acted in a direction opposite to the direction of shifting the centroid position 4a by pivotal movement of the arm 4 in the direction of arrow A. Accordingly, the acceleration determining section 25 determines "ACCELERATE AND PIVOTALLY MOVE", in the case where the obstacle 9 is on a side (i.e. in a direction of increasing the angle θ) opposite to the direction of accelerating the pivotal movement of the arm 4 by the reaction force. This is because the direction of the reaction force acting on the arm 4 by accelerating the arm 6 is aligned with the collision avoiding direction. On the other hand, in the case where the obstacle 9 is in a direction (i.e. in a direction of decreasing the angle θ) of pivotally moving the arm 4 by the reaction force, the acceleration determining section 25 determines "DO NOT ACCELERATE AND PIVOTALLY MOVE". This is because, in this case, the reaction force is acted in the collision direction.

Figure 6C:
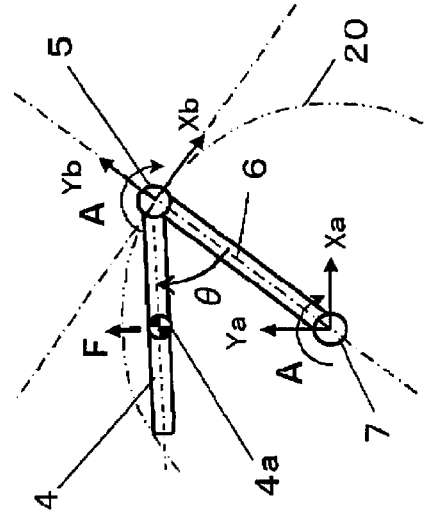

FIG. 6C shows an example, wherein the centroid position 4a of the arm 4 is in the third region. Describing the third region in terms of the angle θ, the third region is a region where 180°<θ<270°. In this case, a reaction force exerted on the centroid position 4a of the arm 4 is acted in the direction of arrow H. Specifically, a reaction force is acted in a direction opposite to the direction of shifting the centroid position 4a by pivotal movement of the arm 4 in the direction of arrow A. Accordingly, the acceleration determining section 25 determines "ACCELERATE AND PIVOTALLY MOVE", in the case where the obstacle 9 is on a side (i.e. in a direction of increasing the angle θ) opposite to the direction of pivotally moving the arm 4 by the reaction force. This is because the direction of the reaction force acting on the arm 4 by accelerating the arm 6 is aligned with the collision avoiding direction. On the other hand, in the case where the obstacle 9 is in a direction (i.e. in a direction of decreasing the angle θ) of pivotally moving the arm 4 by the reaction force, the acceleration determining section 25 determines "DO NOT ACCELERATE AND PIVOTALLY MOVE". This is because, in this case, the reaction force is acted in the collision direction.

Figure 6D:
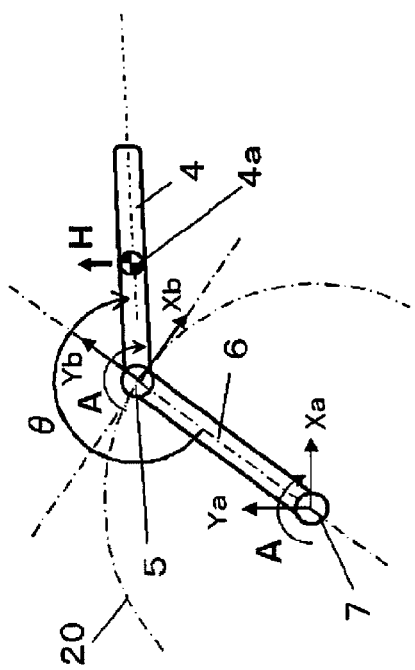

FIG. 6D shows an example, wherein the centroid position 4a of the arm 4 is in the fourth region. Describing the fourth region in terms of the angle θ, the fourth region is a region where 270°<θ<360°. In this case, a reaction force exerted on the centroid position 4a of the arm 4 is acted in the direction of arrow I. Specifically, a reaction force is acted in the same direction as the direction of shifting the centroid position 4a by pivotal movement of the arm 4 in the direction of arrow A. Accordingly, the acceleration determining section 25 determines "ACCELERATE AND PIVOTALLY MOVE", in the case where the obstacle 9 is on a side (i.e. in a direction of decreasing the angle θ) opposite to the direction of pivotally moving the arm 4 by the reaction force. This is because the direction of the reaction force acting on the arm 4 by accelerating the arm 6 is aligned with the collision avoiding direction. On the other hand, in the case where the obstacle 9 is in a direction (i.e. in a direction of increasing the angle θ) of pivotally moving the arm 4 by the reaction force, the acceleration determining section 25 determines "DO NOT ACCELERATE AND PIVOTALLY MOVE". This is because, in this case, the reaction force is acted in the collision direction.

Alternatively, the acceleration determining section 25 may memorize a direction of a reaction force acting on the centroid position of the arm 4 in each of the first through the fourth regions into a storing section (not shown), and determine whether the manipulator 1 is to be accelerated based on the reaction force acting direction memorized in the storing section.

As described above, in the case where a reaction force by an inertia force is determined to contribute to a collision avoiding operation, based on the acceleration determining condition, the acceleration determining section 25 determines "ACCELERATE AND PIVOTALLY MOVE". This allows the control device 22 to accelerate the pivotal movement of the arm 6, if the direction of the reaction force exerted on the centroid position 4a of the arm 4 is determined to contribute to a collision avoiding operation with respect to the obstacle 9. Specifically, a reaction force in an obstacle avoiding direction can be utilized and applied to the arm 4 in addition to a rotation torque in the obstacle avoiding direction by the actuator 51. This enables to promptly avoid collision with the obstacle 9.

Next, an operation to be performed by the manipulator 1 is described referring to FIG. 7. FIG. 7 is a flowchart for describing an obstacle avoiding operation to be performed by the manipulator 1 in accordance with the first embodiment of the invention.

Firstly, the manipulator 1 causes the actuator 31, 51, 71 to drive the joint section 3, 5, 7 in accordance with an operation command from the input section 21 (Step S100).

Then, the manipulator 1 causes the collision monitoring section 23 to monitor collision of the movable member 2, 4, 6 with the obstacle 9 (Step S102).

Then, the manipulator 1 determines whether or not there is a possibility of collision of the movable member 2, 4, 6 with the obstacle 9, based on monitor information outputted from the collision monitoring section 23 (Step S104). Specifically, since the collision monitoring section 23 is activated in the case where there is a possibility of collision of the movable member 2, 4, 6 with the obstacle 9, the collision monitoring section 23 outputs monitor information to the control device 22 in the case where there is a possibility of collision. On the other hand, in the case where there is no possibility of collision of the movable member 2, 4, 6 with the obstacle 9, the collision monitoring section 23 is not activated, and the does not output monitor information to the control device 22. Accordingly, the manipulator 1 is operable to determine presence or absence of a possibility of collision of the movable member 2, 4, 6 with the obstacle 9, based on monitor information. In other words, Step S102 and Step S104 correspond to a collision monitoring step of determining presence or absence of a possibility of collision with respect to each of the movable members 2, 4 and 6.

The manipulator 1 controls the actuator 31, 51, 71, or the moving/driving section 14 in such a manner as to move the movable member 2, 4, 6 in a direction of avoiding the obstacle 9 based on monitor information, in the case where the collision monitoring section 23 is activated (Step S106).

In performing the above operation, the acceleration determining section 25 in the manipulator 1 specifies one of the four regions of a relative coordinate system set with respect to the joint section 5, in which the centroid position (e.g. the centroid position 4a of the arm 4 in the posture shown in FIG. 3A) of a movable member (e.g. the arm 4) specified by the collision monitoring section 23 exists, based on the angle θ defined by the arm 4 and the arm 6. Then, the acceleration determining section 25 determines whether or not a reaction force acting on the centroid position of the movable member (the arm 4) contributes to a collision avoiding operation, in the case where the pivotal movement of the other movable member (e.g. the arm 6) is accelerated, based on the specified region in which the centroid position exists, pivotal direction information of the other movable member (e.g. the arm 6), and positional relation information on the positional relation between the movable member (e.g. the arm 4) and the obstacle 9 (Step S108). Then, the acceleration determining section 25 determines "ACCELERATE AND PIVOTALLY MOVE", in the case where the reaction force generated by acceleration of the other movable member (e.g. the arm 6) contributes to a collision avoiding operation; and determines "DO NOT ACCELERATE AND PIVOTALLY MOVE", in the case where the reaction force does not contribute to a collision avoiding operation. In this example, the condition that a reaction force acting on the centroid position of a movable member (e.g. the arm 4) contributes to a collision avoiding operation corresponds to a condition that a reaction force acting direction is aligned with a collision avoiding direction with respect to the obstacle 9. Further, the condition that a reaction force acting on the centroid position of a movable member (e.g. the arm 4) does not contribute to a collision avoiding operation corresponds to a condition that a reaction force acting direction is aligned with a collision direction with respect to the obstacle 9. In other words, Step S108 corresponds to an acceleration determining step.

In the case where the acceleration determining section 25 has determined "ACCELERATE AND PIVOTALLY MOVE", for instance, the manipulator 1 pivotally moves the arm 4 in a reverse direction (the direction of arrow B) in the posture shown in FIG. 3B, and accelerates the pivotal movement of the arm 6 by increasing a rotation torque of the actuator 71 in addition to the reverse pivotal movement (Step S110). As a result of the above operation, the base end of the arm 4 is applied with a rotary moment around the centroid position 4a by the accelerating operation of the arm 6, in addition to the rotation force by the actuator 51. This enables to promptly perform pivotal movement of the arm 4 in a direction away from the obstacle 9. In other words, Step S110 corresponds to a controlling step. Then, the manipulator 1 determines whether or not the manipulator 1 has avoided collision with the obstacle 9 (Step S112). In the case where it is determined that the manipulator 1 has failed to avoid collision with the obstacle 9, the routine returns to Step S110 to continue acceleration of the pivotal movement. If, on the other hand, it is determined that the manipulator 1 has avoided collision with the obstacle 9, the routine proceeds to Step S114.

After having performed the collision avoiding operation, for instance, the manipulator 1 suspends the operation of the actuator 31, 51, 71, or the moving/driving section 14, and suspends the operation of the movable section 91 (Step S114). In the case where a target position is set, the operation of the movable section 91 may be performed again to move the manipulator 1.

As described above, the manipulator 1 in accordance with the first embodiment is advantageous in utilizing a reaction force by an inertia force acting on a centroid of a movable member in addition to a driving force of the actuator 31, 51, 71 in controlling the movable member specified by the collision monitoring section 23 to perform an operation of avoiding collision with an obstacle. Accordingly, it is possible to realize an operation of promptly avoiding collision of the hand 2, or the arm 4, or the arm 6 with the obstacle 9.

In the first embodiment, the manipulator has two arms i.e. the arms 4 and 6. The invention is not limited to the above. Alternatively, a manipulator constructed in such a manner that three or more movable members are interconnected to each other enables to obtain substantially the same advantage as described above.

In the first embodiment, the moving section 13 is configured to be movable relative to the holding section main body 8a. Alternatively, the holding section 8 may be provided with a driving section such as wheels and configured to be freely movable, and the movement of the holding section 8 may be accelerated in performing a collision avoiding operation. In the modification, the holding section 8 functions as a movable member. In the modification, only one arm may be provided, because the holding section 8 functions as a movable member.

Further alternatively, each of the joint sections 3, 5, and 7 may have a clutch section and a switching section, as will be described later in the second embodiment, and the clutch section of the joint section 5 may be controlled to be freely movable in e.g. performing an operation of avoiding collision of the arm 4.

Second Embodiment

Figure 8:
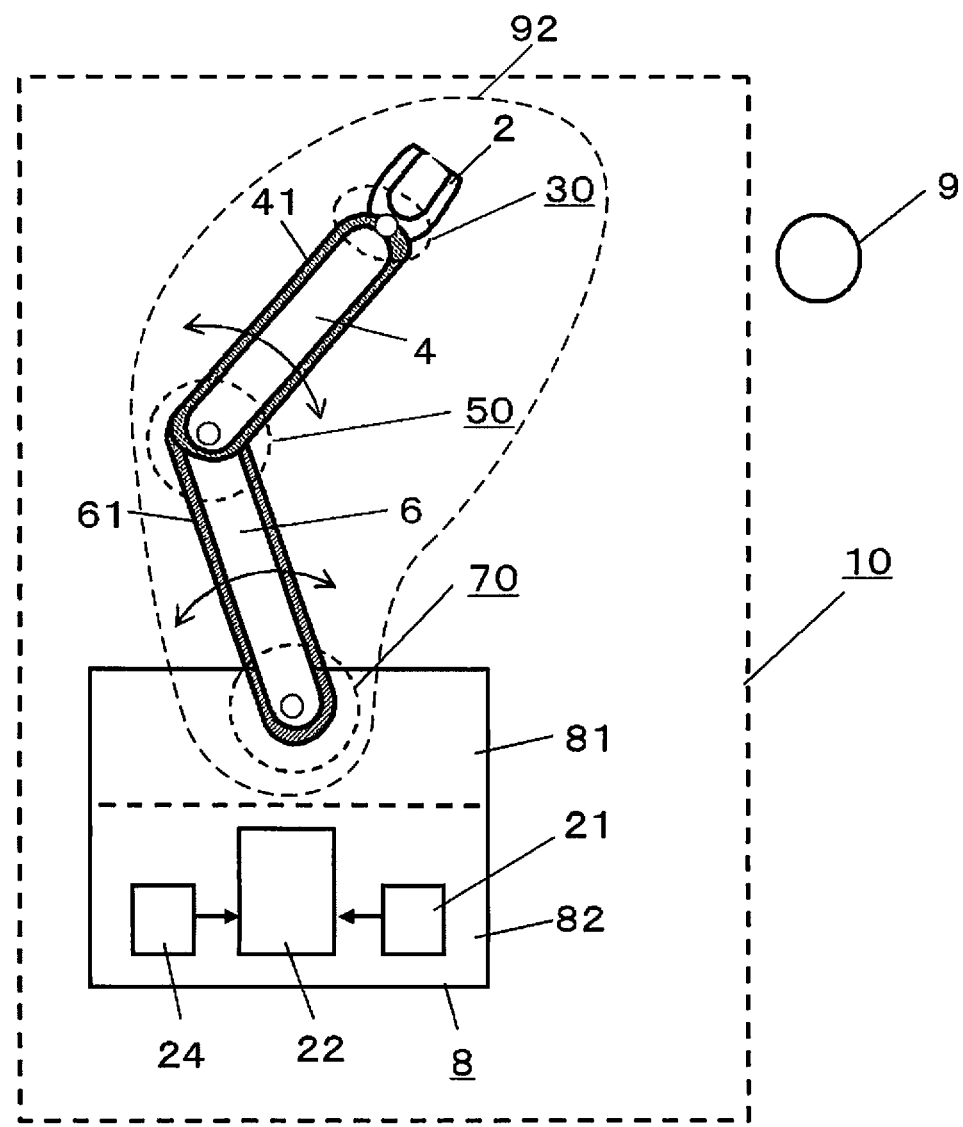
FIG. 8 is a schematic construction diagram of a manipulator in accordance with a second embodiment of the invention.
Figure 9:
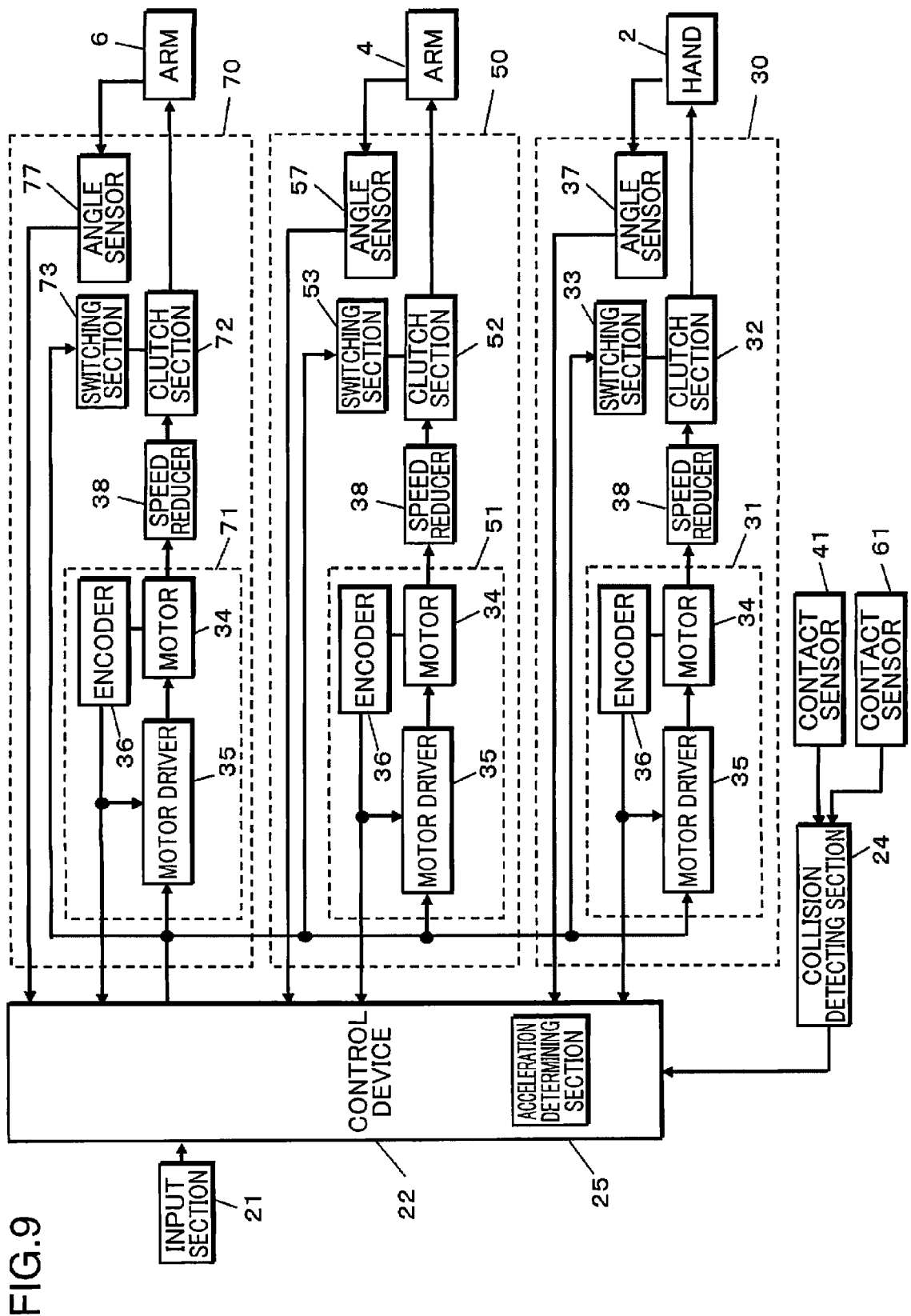
FIG. 9 is a block diagram showing an arrangement of the manipulator in the second embodiment.

In the following, a manipulator 10 in accordance with the second embodiment of the invention is described referring to FIGS. 8 through 10B. FIG. 8 is a schematic construction diagram of the manipulator 10 in accordance with the second embodiment of the invention. FIG. 9 is a block diagram showing a construction of the manipulator 10. FIGS. 10A and 10B are schematic front views of the manipulator 10 for describing a retracting operation to be performed by the manipulator 10. Hereinafter, like elements as in the first embodiment are indicated with like reference numerals.

In the manipulator 1 in accordance with the first embodiment, the collision monitoring section 23 is provided, and a movable member (e.g. the arm 4) having a possibility of collision is specified based on monitor information of the collision monitoring section 23. Then, collision between the specified movable member (e.g. the arm) and the obstacle 9 is avoided by combining a rotation torque in an obstacle avoiding direction exerted on the movable member, and a reaction force by an inertia force acting on the movable member by an accelerating operation of the other movable member (e.g. the arm 6).

In contrast, the manipulator 10 in accordance with the second embodiment is provided with a collision detecting section 24 to be described later. A movable member that has collided with an obstacle 9 is specified based on detection information of the collision detecting section 24, and an impact force to be exerted on the movable member specified by the collision detecting section 24 is alleviated by utilizing a reaction force by an inertia force. Accordingly, even if the manipulator 10 has collided with the obstacle 9, an impact force resulting from collision can be alleviated.

Firstly, a construction of the manipulator 10 in accordance with the second embodiment is described referring to FIG. 8.

The manipulator 10 includes a movable section having a hand 2, an arm 4, and an arm 6, joint sections 30, 50, and 70, and a holding section 8 for holding the movable section.

The hand 2 is interconnected to the arm 4 through the joint section 30. The arm 4 is interconnected to the arm 6 through the joint section 50. The arm 6 is interconnected to the holding section 8 for holding the arm 6 through the joint section 70. The hand 2, the arm 4, the arm 6, and the holding section 8 are pivotally interconnected to each other.

Contact sensors 41 and 61 for detecting contact with the obstacle 9 are respectively disposed on surfaces of the arms 4 and 6.

A pressure-sensitive sheet formed by printing an electrically conductive and pressure-sensitive ink in a matrix pattern may be used as the contact sensors 41 and 61. In this arrangement, the contact sensor 41 is operable to detect contact with the obstacle 9, based on a change in the resistance of the pressure-sensitive sheet, in the case where the arm 4 is contacted with the obstacle 9, and a pressure is applied to the pressure-sensitive sheet. Similarly, the contact sensor 61 is operable to detect contact with the obstacle 9, in the case where the arm 6 is contacted with the obstacle 9, and a pressure is applied to the pressure-sensitive sheet.

The holding section 8 has a mechanism section 81 and a driving section 82. The driving section 82 includes an input section 21 for allowing a user to input an operation command, a collision detecting section 24 for detecting collision with the obstacle 9, and a control device 22. The control device 22 controls movements of the hand 2, the arm 4, and the arm 6, based on operation command information acquired from the input section 21, and detection information acquired from the collision detecting section 24. The collision detecting section 24 is connected to the contact sensors 41 and 61.

Next, a construction and an operation of the manipulator 10 are described referring to FIG. 9. FIG. 9 is a block diagram showing a construction of the manipulator 10 in accordance with the second embodiment of the invention.

The control device 22 controls movements of the hand 2, the arm 4, and the arm 6 in accordance with an operation command from the input section 21. Further, the control device 22 drives actuator 31, 51, 71 to be described later to retract a movable member that has collided with the obstacle 9, based on detection information of the collision detecting section 24. Further, the control device 22 is provided with an acceleration determining section 25. The control device 22 determines whether or not a reaction force by an inertia force acting on a centroid of a movable member is to be utilized in retracting the movable member from the obstacle 9 in accordance with a determination result by the acceleration determining section 25.

The collision detecting section 24 specifies a movable member that has collided with the obstacle 9, based on contact detection information acquired from the contact sensor 41, 61; and outputs detection information of the specified movable member to the control device 22. For instance, the collision detecting section 24 detects that the arm 4 has collided with the obstacle 9, when the contact sensor 41 has detected the contact. Similarly, the collision detecting section 24 detects that the arm 6 has collided with the obstacle 9, when the contact sensor 61 has detected the contact.

The joint section 30, 50, and 70 respectively include the actuators 31, 51, and 71 as joint driving sections, clutch sections 32, 52, and 72 as power transmission sections for transmitting powers of the joint driving sections, switching sections 33, 53, and 73 as power transmission switching sections, and angle sensors 37, 57, and 77.

The clutch section 32 selectively sets the actuator 31 to an operative state where the power of the actuator 31 is transmitted to the hand 2 through a speed reducer 38, and an inoperative state where transmission of the power of the actuator 31 to the hand 2 through the speed reducer 38 is blocked by activating/deactivating the switching section 33. An example of the clutch section 32 is a pair of clutch plates. An example of the switching section 33 is an electromagnet operable to selectively set the paired clutch plates to a contact state/a non-contact state by turning on/off the current supply. The "activated" state of the switching section 33 is a state, wherein the paired clutch plates is in a contact state by turning off the current supply, and the "deactivated" state of the switching section 33 is a state, wherein the paired clutch plates is in a non-contact state by turning on the current supply. The clutch section 32 transmits the power of the actuator 31 to the hand 2 through the speed reducer 38 by setting the paired clutch plates to a contact state. On the other hand, the clutch section 32 blocks transmission of the power of the actuator 31 to the hand 2 through the speed reducer 38 by setting the paired clutch plates to a non-contact state.

Similarly, the clutch section 52 selectively sets the actuator 51 to an operative state where the power of the actuator 51 is transmitted to the arm 4 through a speed reducer 38, and an inoperative state where transmission of the power of the actuator 51 to the arm 4 through the speed reducer 38 is blocked by activating/deactivating the switching section 53. Similarly, the clutch section 72 selectively sets the actuator 71 to an operative state where the power of the actuator 71 is transmitted to the arm 6 through a speed reducer 38, and an inoperative state where transmission of the power of the actuator 71 to the arm 6 through the speed reducer 38 is blocked by activating/deactivating the switching section 73.

In the above arrangement, in the case where the clutch section 32 is in an inoperative state, the joint section 30 is brought to a pivotable (free) state with respect to an external force. Similarly, in the case where the clutch section 52 is in an inoperative state, the joint section 50 is brought to a pivotable (free) state with respect to an external force, and in the case where the clutch section 72 is in an inoperative state, the joint section 70 is brought to a pivotable (free) state with respect to an external force.

An encoder 36 detects rotation information of a motor 34. The control device 22 detects positions and postures of the hand 2, the arm 4, and the arm 6, based on the rotation information and speed reduction ratios of the speed reducers 38; and controls operations of the hand 2, the arm 4, and the arm 6.

The angle sensor 37 detects a posture and a movement of the hand 2 based on absolute joint angle information. Since transmission of the power of the actuator 31 to the hand 2 is blocked when the clutch section 32 is in an inoperative state, it is impossible to detect a movement of the hand 2 by the encoder 36. However, even in this case, the angle sensor 37 is operable to detect a movement of the hand 2. Further, in the case where the clutch section 32 is brought to an operative state again, it is possible to correct the rotation information of the encoder 36 by using the absolute joint angle information of the angle sensor 37. Similarly, the angle sensor 57 detects a posture and a movement of the arm 4 based on absolute joint angle information of the angle sensor 57, and the angle sensor 77 detects a posture and a movement of the arm 6 based on absolute joint angle information of the angle sensor 77.

Examples of the angle sensors 37, 57, and 77 are a magnetic sensor constituted of a hall element or a magnetic resistor element, and a rotary magnet having a north pole and a south pole; and a potentiometer based on a principle of a variable resistor.

Next, a retracting operation to be performed by the manipulator 10 is described referring to FIG. 9, and FIGS. 10A and 10B.

The control device 22 drives the actuator 31, 51, 71 in accordance with an operation command from the input section 21, and acquires, from the collision detecting section 24, detection information of a movable member (the hand 2, or the arm 4, or the arm 6) which has contacted with the obstacle 9. In the case where the collision detecting section 24 has detected that a movable member has collided with the obstacle 9 based on the detection information, the control device 22 starts an operation of retracting the movable member from the obstacle 9, based on e.g. the detection information of the movable member that has collided with the obstacle 9, and driving information of the joint section 50, 70. Specifically, the control device 22 generates control information for retracting the movable member from the obstacle 9, and alleviating an impact force resulting from collision; drives the actuator 31, 51, 71 based on the control information; and controls the joint section 30, 50, 70 to pivotally move the joint section 30, 50, 70.

As shown in FIG. 10A, the manipulator 10 drives the actuator 31, 51, 71 in accordance with an operation command from the input section 21. For instance, the manipulator 10 suspends the operation of the actuator 31, activates the switching section 33, 53, 73, and drives the actuator 51, 71. As a result of the above operation, for instance, the arm 4 is pivotally moved in the direction of arrow A about an axis of rotation of the joint section 50, and the arm 6 is pivotally moved in the direction of arrow A about an axis of rotation of the joint section 70.

In the case where the arm 4 is contacted with the obstacle 9, the contact sensor 41 is activated, and the collision detecting section 24 detects collision between the arm 4 and the obstacle 9, and outputs detection information to the control device 22. The control device 22 sets the switching section 53, 73, and controls the actuator 51, 71 to retract the arm 4 from the obstacle 9 based on the detection information.

Specifically, the control device 22 switches the switching section 53 from an activated state to a deactivated state, after having detected collision between the arm 4 and the obstacle 9, and accelerates pivotal movement of the arm 6 in the direction of arrow A by increasing a driving force of the actuator 71. Specifically, the manipulator 10 accelerates the pivotal movement of the arm 6 in the collision direction (the direction of arrow A) with respect to the obstacle 9 in a state that the joint section 50 is brought to a pivotable (free) state with respect to an external force.

As shown in FIG. 10B, in response to acceleration of pivotal movement of the arm 6 in the direction of arrow A about an axis of rotation of the joint section 70, an inertia force acting on the arm 4 by acceleration of the pivotal movement of the arm 6 is acted as a reaction force, because the joint section 50 is brought to a pivotable (free) state with respect to an external force. As a result of the above operation, the arm 4 is pivotally moved in a direction (the direction of arrow B) away from the obstacle 9 about the axis of rotation of the joint section 50. Accordingly, upon collision, the posture of the arm 4 is changed in the direction of arrow C, despite acceleration of pivotal movement of the arm 6 in the collision direction with respect to the obstacle 9, because a reaction force by an inertia force in the obstacle avoiding direction is exerted on the centroid of the arm 4.

As a result of the above operation, the manipulator 10 is operable to retract the arm 4 from the obstacle 9. Similarly, in the case where the contact sensor 61 is activated, and the collision detecting section 24 has detected collision between the arm 6 and the obstacle 9, the control device 22 drives the actuator 51, 71 in such a manner as to retract the arm 6 from the obstacle 9.

As described above, similarly to the first embodiment, the manipulator 10 in accordance with the second embodiment is advantageous in retracting the arm 4 from the obstacle 9 by utilizing a reaction force by an inertia force. Accordingly, even if an arm is collided with an obstacle, an impact force resulting from collision can be alleviated.

The collision detecting section 24 does not output detection information to the control device 22, as far as the contact sensors 41 and 61 do not detect contact (in other words, a state that both of the arm 4 and the arm 6 do not collide with the obstacle 9). In this state, the control device 22 activates the switching sections 53 and 73 to set the clutch sections 52 and 72 the contact state. As a result of the above operation, the manipulator 10 is operable to move the arm 4 and the arm 6 to respective predetermined positions in accordance an operation command from the input section 21.

Further, in response to output of detection information from the collision detecting section 24, a CPU accepts the detection information by a hardware interrupt, and executes a program for performing a collision avoiding operation. This is advantageous in enhancing the response speed of the control device 22 when collision has occurred.

Furthermore, the manipulator 10 changes the pivotal direction of the motor 34 in a reverse direction upon collision. Accordingly, for instance, it is possible to retract the arm 4 from the obstacle 9 by utilizing a reaction force by an inertia force in combination, in retracting the arm 4 from the obstacle 9 that has collided with the arm 4. This is further advantageous in avoiding collision with the obstacle.

Alternatively, the manipulator 10 may use a collision monitoring section 23 and the collision detecting section 24 in combination, and utilize both of monitor information to be acquired from the collision monitoring section 23 and detection information to be acquired from the collision detecting section 24. This enables to perform an operation of moving a movable member in the collision avoiding direction using the monitor information before collision, in addition to an operation of alleviating an impact force resulting from collision.

Figure 11A:
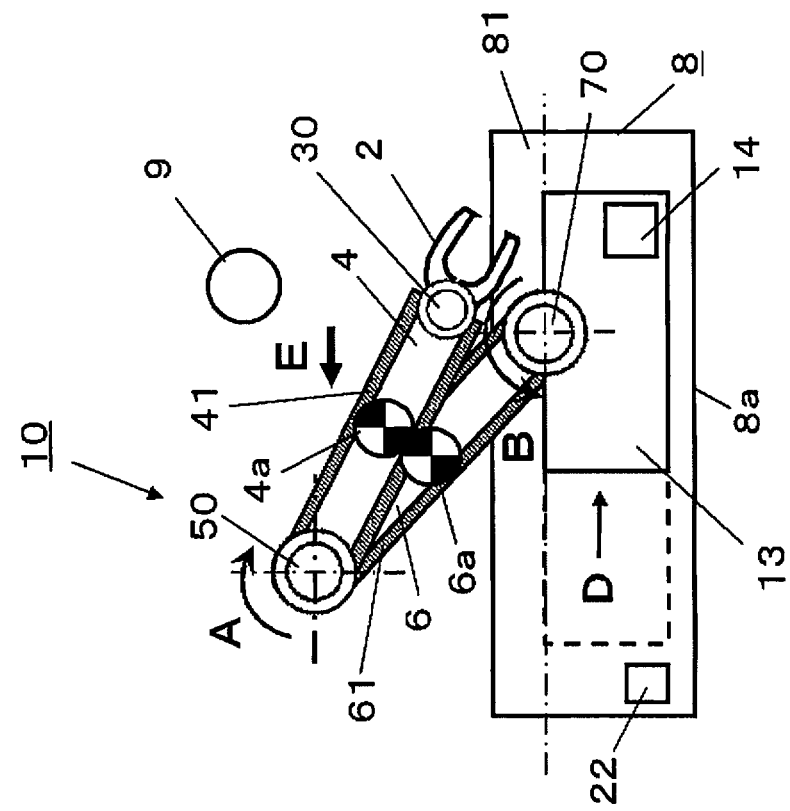
FIGS. 11A and 11B are schematic front views showing a second example of a retracting operation to be performed by the manipulator in the second embodiment.
Figure 11B:
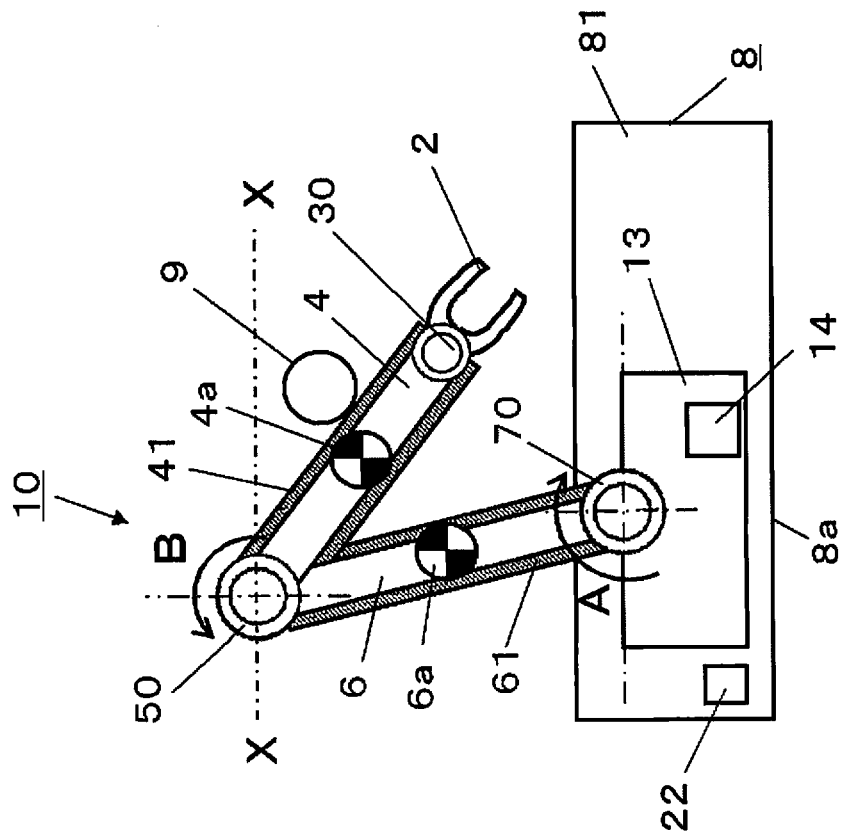

Further alternatively, as shown in FIG. 11A, movement of a moving section 13 may be accelerated in response to detection of collision between a movable member and the obstacle 9. Specifically, in the case where the collision detecting section 24 has detected collision between the arm 4 and the obstacle 9 in a condition that the centroid position 4a of the arm 4 is located at a base end (on the side of the mechanism section 81 with respect to X-X axis) with respect to the joint section 50, the manipulator 10 sets the switching sections 53 and 73 to a deactivated state to bring the two joint sections 50 and 70 to a pivotable (free) state with respect to an external force; and accelerates the movement of the moving section 13 in the collision direction with respect to obstacle 9. As a result of the above operation, as shown in FIG. 11B, since the arm 4 can be retracted from the obstacle 9, an impact force resulting from collision can be alleviated.

Further alternatively, the control device 22 may be provided with a cooperation program for cooperating movements of the joint sections 30, 50, and 70 to operate the joint sections 30, 50, and 70 in cooperation with each other by executing the cooperation program. This enables to enhance the advantages of the collision avoiding operation and the impact force alleviating operation.

In the second embodiment, the control device 22 detects positions and postures of the hand 2, the arm 4, and the arm 6, based on rotation information from the encoders 36 and speed reduction ratios of the speed reducers 38 to control the operations of the hand 2, the arm 4, and the arm 6. Alternatively, positions and postures of the hand 2, the arm 4, and the arm 6 may be detected, using only absolute joint angle information of the angle sensors 37, 57, and 77, to control the operations of the hand 2 and the like, without using the encoders 36. In the modification, it is possible to control the hand 2 and the like without correcting angle information, even in the case where the clutch sections 32, 52, and 72 are brought to an operative state after having been brought to an inoperative state.

INDUSTRIAL APPLICABILITY

The invention is advantageous in controlling a manipulator, and particularly useful as a manipulator to be used in a condition that collision with an obstacle may occur, and a method of controlling the manipulator.

What is claimed is:

1. A method of controlling a manipulator provided with a first movable member, a second movable member, a holding section, a first joint section pivotally interconnecting the first movable member and the second movable member, a second joint section pivotally interconnecting the second movable member and the holding section, a first joint driving section capable of driving the first joint section, and a second joint driving section capable of driving the second joint section, the method comprising:
   a member specifying step of specifying one of the first movable member and the second movable member which has a possibility of collision with an obstacle, the possibility of collision being detection using a photographing section; and
   a controlling step of controlling, by a processor, the first joint driving section and the second joint driving section in such a manner as to pivotally move the one movable member specified in the member specifying step in a direction away from the obstacle, and pivotally move the other movable member in a direction toward the obstacle.

2. The method of controlling the manipulator according to claim 1, wherein
   in the controlling step, the other movable member is determined to be accelerated, in the case where the obstacle is in a direction opposite to a direction of a reaction force generated on the one movable member by acceleration of the pivotal movement of the other movable member, and the other movable member is determined not to be accelerated, in the case where the obstacle is in the direction of the reaction force.

3. A method of controlling a manipulator provided with a first movable member, a second movable member, a moving section including a driving section, a first joint section pivotally interconnecting the first movable member and the second movable member, a second joint section pivotally interconnecting the second movable member and the moving section, a first joint driving section capable of driving the first joint section, and a second joint driving section capable of driving the joint section, the method comprising:
a member specifying step of specifying one of the first movable member and the second movable member which has a possibility of collision with an obstacle, the possibility of collision being detected using a photographing section; and
a controlling step of controlling, by a processor, the first joint driving section, the second joint driving section, and the driving section in such a manner as to pivotally move the one movable member specified in the member specifying step in a direction away from the obstacle, move the moving section in the direction away from the obstacle, in the case where the one movable member is the first movable member, and move the moving section in a direction toward the obstacle, in the case where the one movable member is the second movable member.

4. A manipulator comprising:
a first movable member;
a second movable member;
a holding section;
a first joint section pivotally interconnecting the first movable member and the second movable member;
a second joint section pivotally interconnecting the second movable member and the holding section;
a first joint driving section capable of driving the first joint section;
a second joint driving section capable of driving the second joint section;
a collision monitoring section for specifying one of the first movable member and the second movable member which has a possibility of collision with an obstacle, the possibility of collision being detected using a photographing section; and
a control device for controlling the first joint driving section and the second joint driving section in such a manner as to pivotally move the one movable member specified by the collision monitoring section in a direction away from the obstacle, and pivotally move the other movable member in a direction toward the obstacle.

5. The manipulator according to claim 4, wherein
the control device includes an acceleration determining section for determining whether or not the pivotal movement of the other movable member is to be accelerated, based on positional relation information representing a positional relation between the one movable member specified by the collision monitoring section, and the obstacle, angle information representing an angle defined by the first movable member and the second movable member, and pivotal direction information representing a pivotal direction of the other movable member.

6. The manipulator according to claim 4, wherein
the holding section includes a moving section configured to hold the second movable member and be movable by a driving section, and the control device controls the driving section to move the moving section in a direction away from the obstacle, in the case where the one movable member is the first movable member, and move the moving section in a direction toward the obstacle, in the case where the one movable member is the second movable member.

7. The manipulator according to claim 4, wherein
the collision monitoring section derives a position of the obstacle based on photographed images obtained by at least two photographing sections, and specifies one of the first movable member and the second movable member which has a possibility of collision with the obstacle.

8. The manipulator according to claim 5, wherein
the acceleration determining section determines, based on the positional relation information, the angle information, and the pivotal direction information, that the pivotal movement of the other movable member is to be accelerated, in the case where the obstacle is in a direction opposite to a direction of a reaction force generated on the one movable member by acceleration of the pivotal movement of the other movable member, and that the pivotal movement of the other movable member is not to be accelerated, in the case where the obstacle is in the direction of the reaction force.

9. The manipulator according to claim 8, wherein
assuming a direction of pivotally moving the other movable member about an axis of pivotal movement of the first joint section is a positive direction, and the angle defined by the first movable member and the second movable member is $\theta$, and in the case where the other movable member is pivotally moved in the pivotal direction, the acceleration determining section:
determines that the pivotal movement of the other movable member is to be accelerated, in the case where a condition: $0°<\theta<90°$ or $270°<\theta<360°$ is satisfied, and the obstacle is in a direction of decreasing the angle $\theta$;
determines that the pivotal movement of the other movable member is not to be accelerated, in the case where a condition: $0°<\theta<90°$ or $270°<\theta<360°$ is satisfied, and the obstacle is in a direction of increasing the angle $\theta$;
determines that the pivotal movement of the other movable member is to be accelerated, in the case where a condition: $90°<\theta<180°$ or $180°<\theta<270°$ is satisfied, and the obstacle is in a direction of increasing the angle $\theta$; and
determines that the pivotal movement of the other movable member is not to be accelerated, in the case where a condition: $90°<\theta<180°$ or $180°<\theta<270°$ is satisfied, and the obstacle is in a direction of decreasing the angle $\theta$.

10. A manipulator comprising:
a first movable member;
a second movable member;
a holding section;
a first joint section pivotally interconnecting the first movable member and the second movable member;
a second joint section pivotally interconnecting the second movable member and the holding section;
a first joint driving section capable of driving the first joint section;
a second joint driving section capable of driving the second joint section;
a collision detecting section for specifying one of the first movable member and the second movable member which has a collision with an obstacle, the collision being detected by a contact sensor; and
a control device for controlling the first joint driving section and the second joint driving section in such a manner as to pivotally move the one movable member specified by the collision detecting section in a direction away from the obstacle, and pivotally move the other movable member in a direction toward the obstacle.

11. A manipulator comprising:
a first movable member;
a second movable member;
a first joint section pivotally interconnecting the first movable member and the second movable member;
a moving section including a driving section;
a second joint section pivotally interconnecting the second movable member and the moving section;
a first joint driving section capable of driving the first joint section;
a second joint driving section capable of driving the second joint section;
a collision monitoring section for specifying one of the first movable member and the second movable member which has a possibility of collision with an obstacle, and
a control device for controlling the first joint driving section, the second joint driving section, and the driving section in such a manner as to pivotally move the one movable member specified by the collision monitoring section in a direction away from the obstacle, move the moving section in the direction away from the obstacle, in the case where the one movable member is the first movable member, and move the moving section in a direction toward the obstacle, in the case where the one movable member is the second movable member.

12. The manipulator according to claim 11, wherein
the control device includes an acceleration determining section for determining whether or not the moving section is to be accelerated, based on positional relation information representing a positional relation between the one movable member specified by the collision monitoring section, and the obstacle, and angle information representing an angle defined by the first movable member and the second movable member.

13. The manipulator according to claim 12, wherein
the acceleration determining section determines, based on the positional relation information and the angle information, that the moving section is to be accelerated, in the case where the obstacle is in a direction opposite to a direction of a reaction force generated on a centroid of the one movable member by acceleration of the moving section, and that the moving section is not to be accelerated, in the case where the obstacle is in the direction of the reaction force.

* * * * *